Nov. 13, 1934.  V. J. GILMORE  1,980,580
GUIDE BEARING FOR SPINDLES OF CENTRIFUGES
Filed May 13, 1933
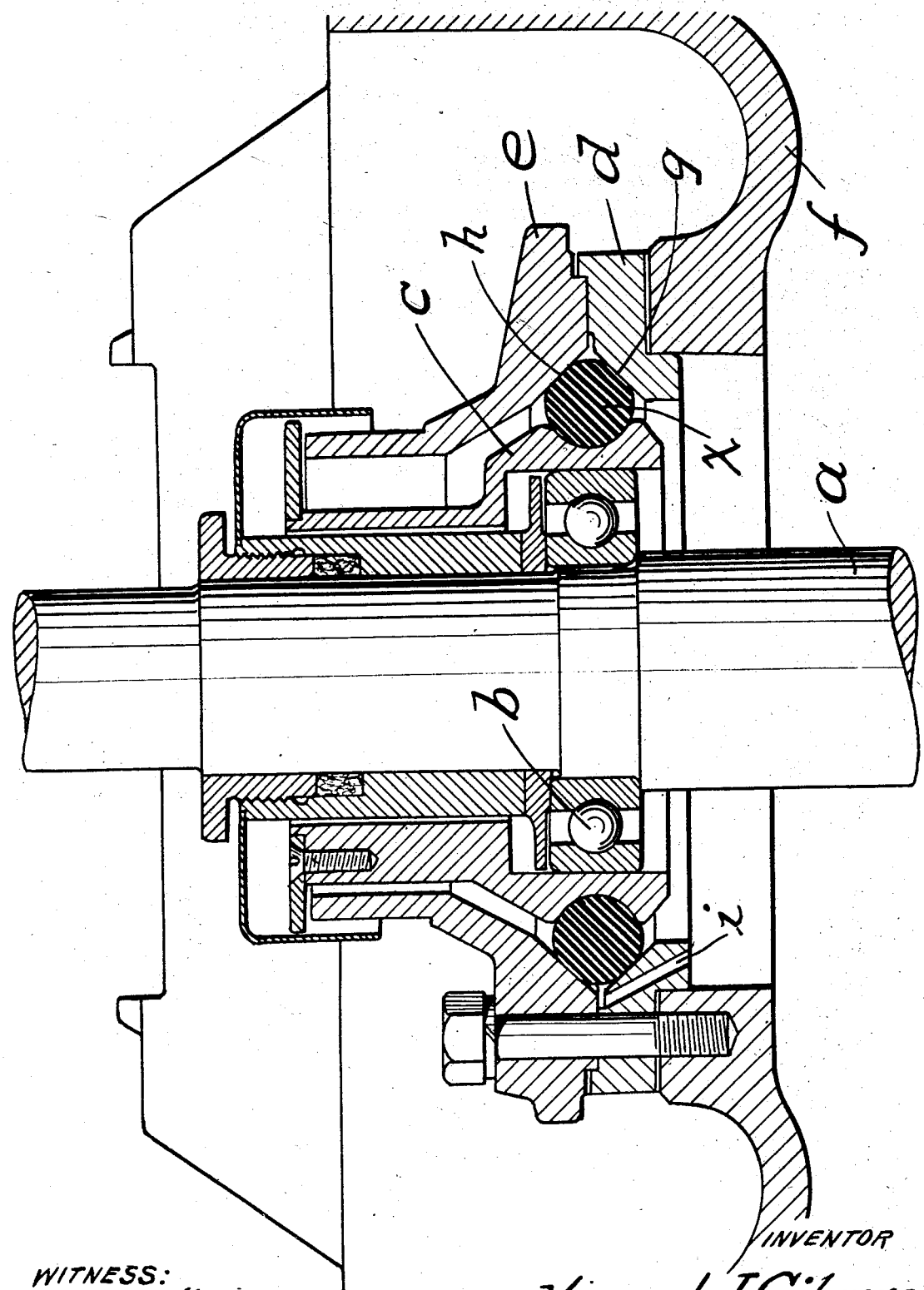

Patented Nov. 13, 1934

1,980,580

UNITED STATES PATENT OFFICE 1,980,580

GUIDE BEARING FOR SPINDLES OF CENTRIFUGES

Vincent J. Gilmore, Wappingers Falls, N. Y., assignor to The De Laval Separator Company, New York, N. Y., a corporation of New Jersey Application May 13, 1933, Serial No. 670,913

3 Claims. (Cl. 308—184)

My invention is an improvement in bearings for guiding the upper ends of spindles supporting rapidly rotating centrifugal bowls.

It is known to provide, for such spindles, a metallic bearing having around it a groove adapted to fit inside a rubber or rubberlike ring of circular cross section and to provide, in the frame of the machine, a seat, in one or two pieces, adapted to conform to and support the outer part of the ring. The ring, by its elasticity, permits that slight oscillation of the bearing which is necessary to enable it to follow the vibrations of the spindle that occur when the parts are not in perfect balance.

I have found that with this construction, in a frame having lubricating oil splashed around its inside, there is always an objectionable seepage or pumpage of oil up past the ring into the space around the bearing. The main object of my invention is to prevent this seepage or pumpage of oil.

I have found that if, instead of supporting the ring by a surrounding surface conforming to its shape, I support it between two hollow frustro-conical surfaces with their large diameter ends together and provide oil escape channels from the point of greatest diameter back to the inside of the frame, oil will not work up past the ring.

The accompanying drawing is a vertical sectional view of a spindle-guiding bearing embodying my invention.

a is a spindle adapted to support and drive a centrifugal bowl. The spindle guiding bearing shown includes a ball bearing b and a retainer c therefor supported by a ring x of rubberlike material at the upper end of a chamber from which oil is splashed against the bottom of the bearing. On the top wall f of this chamber are supported rings d and e having, one on each, hollow frustro-conical surfaces g and h adapted to support and clamp the rubberlike ring x in position to support the retaining member c. The best results are secured if these surfaces extend at an angle of about 45° to the center line or at an angle of about 90° to each other. The rubberlike ring need not have a precisely circular cross-section. Within ring d are formed one or more oil drain passages i leading from the space between surfaces g and h and ring e to the interior of the frame.

What I claim and desire to protect by Letters Patent is:

1. The combination of the vertical bowl-driving spindle of a centrifugal separator, a spindle-guiding bearing member, a rubber-like ring surrounding and supporting said member, an enclosing frame, means secured to the frame and providing two frustro-conical surfaces surrounding and clamping between them said bearing-supporting ring and providing also a substantially annular channel spacing apart the large diameter ends of said frustro-conical surfaces, there being a passage communicating with said channel and the interior of the frame.

2. The combination of the vertical bowl-driving spindle of a centrifugal separator, a spindle-guiding bearing member, a rubber-like ring surrounding and supporting said member, an enclosing frame, metal rings, one above the other, means securing said rings to the frame, said rings having inside frustro-conical surfaces adapted to support and clamp the rubber-like ring in position to support said member, said rings being spaced apart substantially throughout their circumferences adjacent the large diameter ends of their frustro-conical surfaces to form a substantially annular oil escape channel, there being an oil escape passage extending downward from said channel and communicating with the interior of the frame.

3. The combination of the vertical bowl-driving spindle of a centrifugal separator, a spindle guiding bearing member, a rubber-like ring surrounding and supporting said member, an enclosing frame, means secured to the frame and providing two frustro-conical surfaces surrounding and clamping between them said bearing supporting ring and providing a triangular cross-sectioned annular channel between them and the ring, there being a passage leading from said channel to the interior of the frame.

VINCENT J. GILMORE.